US009858928B2

(12) United States Patent
Hafsteinsson et al.

(10) Patent No.: US 9,858,928 B2
(45) Date of Patent: *Jan. 2, 2018

(54) LOCATION-BASED RESPONSES TO TELEPHONE REQUESTS

(71) Applicant: Google Inc., Mountain View, CA (US)

(72) Inventors: Gudmundur Hafsteinsson, Los Gatos, CA (US); Michael J. LeBeau, New York, NY (US); Natalia Marmasse, Ichud (IL); Sumit Agarwal, Washington, DC (US); Dipchand Nishar, Los Altos, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/422,556

(22) Filed: Feb. 2, 2017

(65) Prior Publication Data

US 2017/0148439 A1 May 25, 2017

Related U.S. Application Data

(63) Continuation of application No. 14/478,658, filed on Sep. 5, 2014, now Pat. No. 9,600,229, which is a (Continued)

(51) Int. Cl.
*G10L 15/26* (2006.01)
*G10L 15/06* (2013.01)
(Continued)

(52) U.S. Cl.
CPC ............ *G10L 15/22* (2013.01); *G10L 15/265* (2013.01); *G10L 15/30* (2013.01);
(Continued)

(58) Field of Classification Search
CPC ....... G10L 15/22; G10L 15/26; G10L 15/265; G10L 15/30; G10L 21/00
(Continued)

(56) References Cited

U.S. PATENT DOCUMENTS 5,712,901 A 1/1998 Meermans
5,870,454 A 2/1999 Dahlen
(Continued)

FOREIGN PATENT DOCUMENTS

JP 11-331363 11/1999
JP 2001-222494 8/2001
(Continued)

OTHER PUBLICATIONS

Gruenstein et al., "Scalable and Protable Web-Based Multimodal Dialogue Interaction with Geographical Databases," in: Proc. Interspeech, 2006, pp. 453-456.
(Continued)

*Primary Examiner* — Edgar Guerra-Erazo
(74) *Attorney, Agent, or Firm* — Fish & Richardson P.C.

(57) ABSTRACT

A method for receiving processed information at a remote device is described. The method includes transmitting from the remote device a verbal request to a first information provider and receiving a digital message from the first information provider in response to the transmitted verbal request. The digital message includes a symbolic representation indicator associated with a symbolic representation of the verbal request and data used to control an application. The method also includes transmitting, using the application, the symbolic representation indicator to a second information provider for generating results to be displayed on the remote device.

18 Claims, 6 Drawing Sheets

Related U.S. Application Data continuation of application No. 14/150,134, filed on Jan. 8, 2014, now Pat. No. 8,856,005, which is a continuation of application No. 11/695,333, filed on Apr. 2, 2007, now Pat. No. 8,650,030.

(51) Int. Cl.
| | | |
|---|---|---|
| *G10L 17/00* | (2013.01) | |
| *G10L 15/22* | (2006.01) | |
| *G10L 15/30* | (2013.01) | |
| *H04M 1/725* | (2006.01) | |

(52) U.S. Cl.
CPC ... *H04M 1/72522* (2013.01); *G10L 2015/221* (2013.01); *G10L 2015/223* (2013.01); *H04M 2201/40* (2013.01); *H04M 2242/15* (2013.01)

(58) Field of Classification Search
USPC ............. 704/235, 243, 246, 270, 270.1, 275
See application file for complete search history.

(56) References Cited

U.S. PATENT DOCUMENTS

| | | |
|---|---|---|
| 6,225,993 B1 | 5/2001 | Lindblad et al. |
| 6,292,543 B1 | 9/2001 | Cannon |
| 6,304,645 B1 | 10/2001 | Holland et al. |
| 6,335,964 B1 | 1/2002 | Bowater et al. |
| 6,381,465 B1 | 4/2002 | Chern et al. |
| 6,421,427 B1 | 7/2002 | Hill et al. |
| 6,426,956 B1 | 7/2002 | Eteminan |
| 6,430,497 B1 | 8/2002 | Gaertner et al. |
| 6,430,602 B1 | 8/2002 | Kay et al. |
| 6,480,599 B1 | 11/2002 | Ainslie et al. |
| 6,584,179 B1 | 6/2003 | Fortier et al. |
| 6,604,045 B2 | 8/2003 | Kuroda et al. |
| 6,615,172 B1 | 9/2003 | Bennett et al. |
| 6,636,831 B1 | 10/2003 | Profit et al. |
| 6,654,448 B1 | 11/2003 | Agraharam et al. |
| 6,742,021 B1 | 5/2004 | Halverson et al. |
| 6,760,705 B2 | 7/2004 | Dvorak |
| 6,775,359 B1 | 8/2004 | Ron et al. |
| 6,785,255 B2 | 8/2004 | Sastri et al. |
| 6,804,330 B1 | 10/2004 | Jones et al. |
| 6,917,917 B1 | 7/2005 | Kim |
| 6,920,425 B1 | 7/2005 | Will et al. |
| 6,961,414 B2 | 11/2005 | Inon et al. |
| 7,003,463 B1 | 2/2006 | Maes et al. |
| 7,031,449 B1 | 4/2006 | Lundy et al. |
| 7,036,128 B1 | 4/2006 | Julia et al. |
| 7,177,402 B2 | 2/2007 | Metcalf |
| 7,299,186 B2 | 11/2007 | Kuzunuki et al. |
| 7,313,525 B1 | 12/2007 | Packingham et al. |
| 7,363,295 B2 | 4/2008 | Szeto et al. |
| 7,460,652 B2 | 12/2008 | Chang |
| 7,509,374 B2 | 3/2009 | Trinh |
| 7,650,380 B2 | 1/2010 | Andreev |
| 7,904,294 B1 | 3/2011 | Rose et al. |
| 8,244,285 B2 | 8/2012 | Mendiola |
| 8,650,030 B2 | 2/2014 | Hafsteinsson et al. |
| 2002/0035474 A1 | 3/2002 | Alpdemir |
| 2002/0091527 A1 | 7/2002 | Shiau |
| 2002/0188681 A1* | 12/2002 | Gruen ................. G06Q 10/107 709/204 |
| 2003/0006912 A1 | 1/2003 | Brescia |
| 2003/0007609 A1 | 1/2003 | Yuen et al. |
| 2003/0069991 A1 | 4/2003 | Brescia |
| 2003/0078777 A1 | 4/2003 | Shiau |
| 2003/0079024 A1 | 4/2003 | Hough et al. |
| 2003/0144846 A1 | 7/2003 | Denenberg et al. |
| 2003/0163321 A1 | 8/2003 | Mault |
| 2003/0171928 A1 | 9/2003 | Falcon et al. |
| 2003/0217335 A1* | 11/2003 | Chung ................. G06F 17/2785 715/206 |
| 2004/0054539 A1 | 3/2004 | Simpson |
| 2004/0120473 A1 | 6/2004 | Birch et al. |
| 2004/0122810 A1 | 6/2004 | Mayer |
| 2004/0172254 A1 | 9/2004 | Sharma et al. |
| 2005/0033582 A1 | 2/2005 | Gadd et al. |
| 2005/0049860 A1 | 3/2005 | Junqua et al. |
| 2005/0192809 A1 | 9/2005 | Dodrill et al. |
| 2006/0026013 A1 | 2/2006 | Kraft |
| 2006/0166656 A1 | 7/2006 | Klicpera et al. |
| 2006/0235694 A1 | 10/2006 | Cross et al. |
| 2007/0005570 A1* | 1/2007 | Hurst-Hiller ..... G06F 17/30654 |
| 2007/0006327 A1 | 1/2007 | Lal et al. |
| 2007/0027692 A1 | 2/2007 | Sharma et al. |
| 2007/0061486 A1 | 3/2007 | Trinh |
| 2007/0100690 A1 | 5/2007 | Hopkins |
| 2007/0207821 A1* | 9/2007 | Tran ................... G06Q 30/0209 455/466 |
| 2008/0153465 A1* | 6/2008 | Evermann ......... G06F 17/30899 455/414.1 |
| 2008/0162141 A1 | 7/2008 | Lortz |
| 2008/0188198 A1 | 8/2008 | Patel et al. |
| 2008/0244023 A1 | 10/2008 | Guedalia |
| 2014/0120965 A1 | 5/2014 | Hafsteinsson et al. |

FOREIGN PATENT DOCUMENTS

| | | |
|---|---|---|
| JP | 2002-318132 | 10/2002 |
| JP | 2003-319085 | 11/2003 |
| JP | 2004-078450 | 3/2004 |
| JP | 2005-147925 | 6/2005 |
| JP | 2006-155350 | 6/2006 |
| KR | 20040032523 | 4/2004 |
| WO | WO 2005/091128 | 9/2005 |

OTHER PUBLICATIONS

Hu et al., "Speech-Enabled Web Services for Mobile Devices," in: Proc. The International Conference on Semantic Web and Webservices, 2006, 7 pages.

"Voice Activated Meeting Scheduling Mechanism," IBM Technical Disclosure Bulletin, International Business Machines Corp, 1994, 37(4A):9.

Johnston et al, "Multimodal Language processing for mobile information Access," ICSLP 2002: 7th International Conference on Spoken Language Processing, 2002, 2237-2240.

Key Pousttchi, Martin Schurig, "Assessment of Today's Mobile Banking Applications from the View of Customer Requirements," hicss, p. 70184a, Proceedings of the 37th Annual Hawaii International Conference on System Sciences (HICSS'04)—Track 7, 2004 (10 pages).

Glaser, M. and W.D. Tucker (2001). Web-based Telephony Bridges for the Deaf. Proceedings of the South African Telecommunications Networks & Applications Conference (SATNAC 2001), Wild Coast Sun, South Africa (5 pages.

Examination Report in Australian Application No. 2008232435, dated Mar. 30, 2012, 9 pages.

Japanese Office Action in Japanese Application No. 2010-502253, dated Jan. 15, 2013, 12 pages.

European Search Report in European Application No. 08744910.4, dated Dec. 12, 2012, 9 pages.

Translation of Chinese Office Action in Chinese Application No. 200880017420.3, dated Nov. 30, 2011, 13 pages.

Australian Office Action in Australian Application No. 2008232435, dated Apr. 4, 2013, 3 pages.

Australian Office Action in Australian Application No. 2008232435, dated Oct. 3, 2013, 4 pages.

Australian Office Action in Australian Application No. 2014201912, dated Apr. 24, 2015, 3 pages.

\* cited by examiner

LOCATION-BASED RESPONSES TO TELEPHONE REQUESTS

This application is a continuation application of and claims priority to U.S. application Ser. No. 14/478,658, filed on Sep. 5, 2014, which is a continuation of and claims priority to U.S. application Ser. No. 14/150,134, filed on Jan. 8, 2014, which is a continuation of and claims priority to U.S. application Ser. No. 11/695,333, filed on Apr. 2, 2007, the entire contents of which are hereby incorporated by reference.

TECHNICAL FIELD

Implementations are described that relate to information retrieval, and more particularly to information retrieval based on verbal requests.

BACKGROUND

As computers and computer networks become more and more able to access a wide variety of information, people are demanding more ways to obtain that information. Specifically, people now expect to have access, on the road, in the home, or in the office, to information previously available only from a permanently-connected personal computer hooked to an appropriately provisioned network. They want graphical maps of locations from their cell phones, access to calendars from their personal digital assistants (PDAs), up-to-date contact information from their email devices, and timely, accurate search results from all their devices. They also want all of this information when traveling, whether locally, domestically, or internationally, in an easy-to-use, portable device.

Some systems provide information to a user when the user calls from a cell phone. For example, a user interested in the address for a particular business can call a directory service, where a customer service representative can provide the user with the business's address. This information, however, may not be provided in graphical form, for example, as a map. Additionally, other useful information, such as directions to the location and other similar businesses nearby may not be provided by the customer service representative. Also, the user may have to wait until a customer service representative is available to take the user's call.

In other systems, a user may enter a request for information, such as a map of a business location, by inputting the request using a keypad of a mobile device. Portability, however, generally requires a device small in size, which in turn limits the number of data entry keys and the amount of memory and available processing power. In addition, ultra portable devices often must be held in one hand or not held at all, so that data entry must be one-handed or no-handed. This can make entering information to obtain rich content, such as graphical maps, difficult.

SUMMARY

Implementations are described that relate to information retrieval based on verbal requests.

In a first general aspect, a method for receiving processed information at a remote device is described. The method includes transmitting from the remote device a verbal request to a first information provider and receiving a digital message from the first information provider in response to the transmitted verbal request. The digital message includes a symbolic representation indicator associated with a symbolic representation of the verbal request and data used to control an application. The method also includes transmitting, using the application, the symbolic representation indicator to a second information provider for generating results to be displayed on the remote device.

In a second general aspect, a method for providing a user with location-based information is described. The method includes receiving a verbal request for locational information from a mobile device and converting the verbal request into a symbolic representation. The method also includes generating a message including the symbolic representation and an indicator used to control an application on the mobile device. Additionally, the method includes transmitting the message to the mobile device to cause the application to use the symbolic representation to display one or more locations associated with the symbolic representation.

In another general aspect, a method for receiving location-based information is described. The method includes transmitting from a mobile device a verbal request for locational information to a first information provider and receiving a Short Message Service message from the first information provider including a symbolic representation of the verbal request and an identifier used to control an application on the mobile device. The method also includes transmitting a data request including the symbolic representation of the verbal request for locational information to a second information provider using the application on the mobile device and displaying on the mobile device one or more locations associated with the symbolic representation using locational information transmitted by the second information provider in response to the data request.

In yet another general aspect, a method for providing processed data to a remote device is described. The method includes receiving a verbal request from the remote device and generating a data response for the verbal request. The data response includes data for controlling an application on the remote device and a conversion of the verbal request, wherein the converted verbal request is accessible by the application. The method also includes transmitting the data response to the remote device to cause the remote device to control the application, process at least a portion of the converted verbal request, and display results generated from the processing.

In another general aspect, a system for providing location-based information to a plurality of users is described. The system includes an interface for receiving verbal requests over a voice transmission line from a plurality of remote devices, a conversion module for converting the verbal requests into a symbolic representation of the verbal request, and means for outputting digital messages to the remote devices. Each message includes an identifier used to control an application on a remote device and a symbolic representation indicator used by the application to process the symbolic representation.

The systems and techniques described here may provide one or more of the following advantages. First, a system may increase the amount and type of information accessible to a remote device by passing, to an application on the remote device, seed information used to derive additional information. Second, a system decreases inconvenience of text entry on mobile devices. Third, a system provides increased efficiency and accuracy by offloading voice-recognition functions from a mobile device to a server. Fourth, a system increases efficiency because it enables transportation protocols of limited size be used to provide rich content to mobile devices.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

System 100 can translate a verbal request 102 from a remote device, such as a voice telephone call from a cell phone, into a symbolic representation, such as text, which can be used by an application on the remote device to initiate a query for information, for example, a search query.

Figure 1:
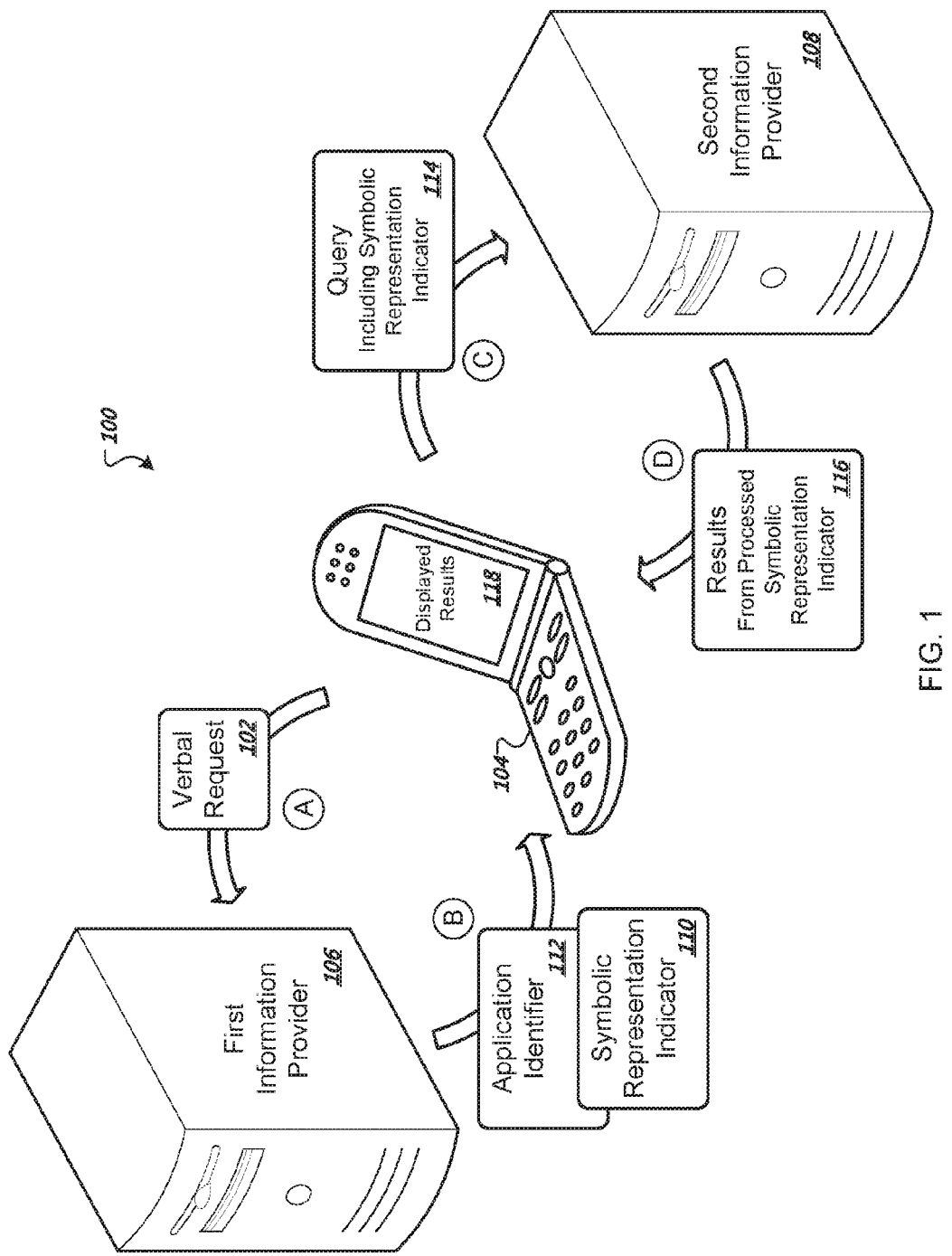
FIG. 1 is a schematic diagram depicting an example of a system for processing a verbal request to present information on a remote device.

FIG. 1 is a schematic diagram depicting an example of the system 100 for processing the verbal request 102 to present information on the remote device 104. The system 100 includes a first information provider 106 and a second information provider 108. In certain implementations, the first information provider 106 is a directory assistance service, such as a "411" service, and the verbal request 102 is a call to the directory assistance service. In these and other implementations, the second information provider may be a search engine that processes search queries and returns search results based on the queries.

The remote device 104 (e.g., a cellular phone, a personal digital assistant, or an e-mail device) transmits the verbal request 102 to the first information provider 106. The verbal request 102 may include, for example, a request for a list of restaurants of a particular type in a particular location (e.g., "Pizza, Palo Alto").

The first information provider 106 receives the verbal request 102 and converts the verbal request 102 into a symbolic representation. For example, the first information provider 106 may perform a speech-to-text operation on the verbal request 102, which converts the verbal request to ASCII ("American Standard Code for Information Interchange" text. In other examples, the first information provider 106 can convert the verbal request into other symbolic representations, such as binary or hexadecimal, which the remote device 104 can use in a query 114 described below.

In other implementations, the first information provider 106 can convert the verbal request to character sets other than ASCII. For example, in an international context, the verbal request can be converted into ISO-8858-1 or UTF-8 (8-bit Unicode Transformation Format).

The first information provider 106 transmits a symbolic representation indicator 110 to the remote device 104 that indicates what the symbolic representation is or from where the symbolic representation may be retrieved. For example, the symbolic representation indicator can be substantially the same as the converted symbolic representation, or the symbolic representation indicator can be a pointer or address location (e.g., uniform resource locator) of the converted symbolic representation.

Additionally, the first information provider 106 transmits an application identifier 112 to the remote device 104. The remote device 104 uses the application identifier to launch an application, such as a mapping and directions application. The remote device 104 uses the application to transmit the symbolic representation indicator to the second information provider 108. For example, the remote device 104 may send the query 114 to the second information provider 108, including the symbolic representation indicator 110, requesting a map of restaurants in the Palo Alto area that serve pizza.

The second information provider 108 processes the query 114 and transmits results 116 of processing the query 114 to the remote device 104. For example, the second information provider 108 may transmit a map to the remote device 104 that highlights restaurants in Palo Alto that serve pizza. The remote device 104 receives the results 116 and presents displayed results 118, such as the map of restaurants, to a user.

Combining the examples above, a cell phone 104 can transmit a "411" request for "Pizza, Palo Alto," as shown by arrow A. The request is received by a directory assistance provider 106, which converts the verbal request to text 110 and transmits the text 110 along with a binary message used to launch a mapping program on the remote device 104, as shown by arrow B. The remote device 104 receives the binary message, launches the mapping program by executing the binary message, and uses the mapping program to transmit to a mapping server 108 a query "Pizza, Palo Alto" 118, as shown by arrow C. The mapping server 108 processes the query and returns results 116 including a map highlighting pizza restaurants in Palo Alto, Calif., as shown by arrow D. Then remote device displays the map to the user.

Figure 2:
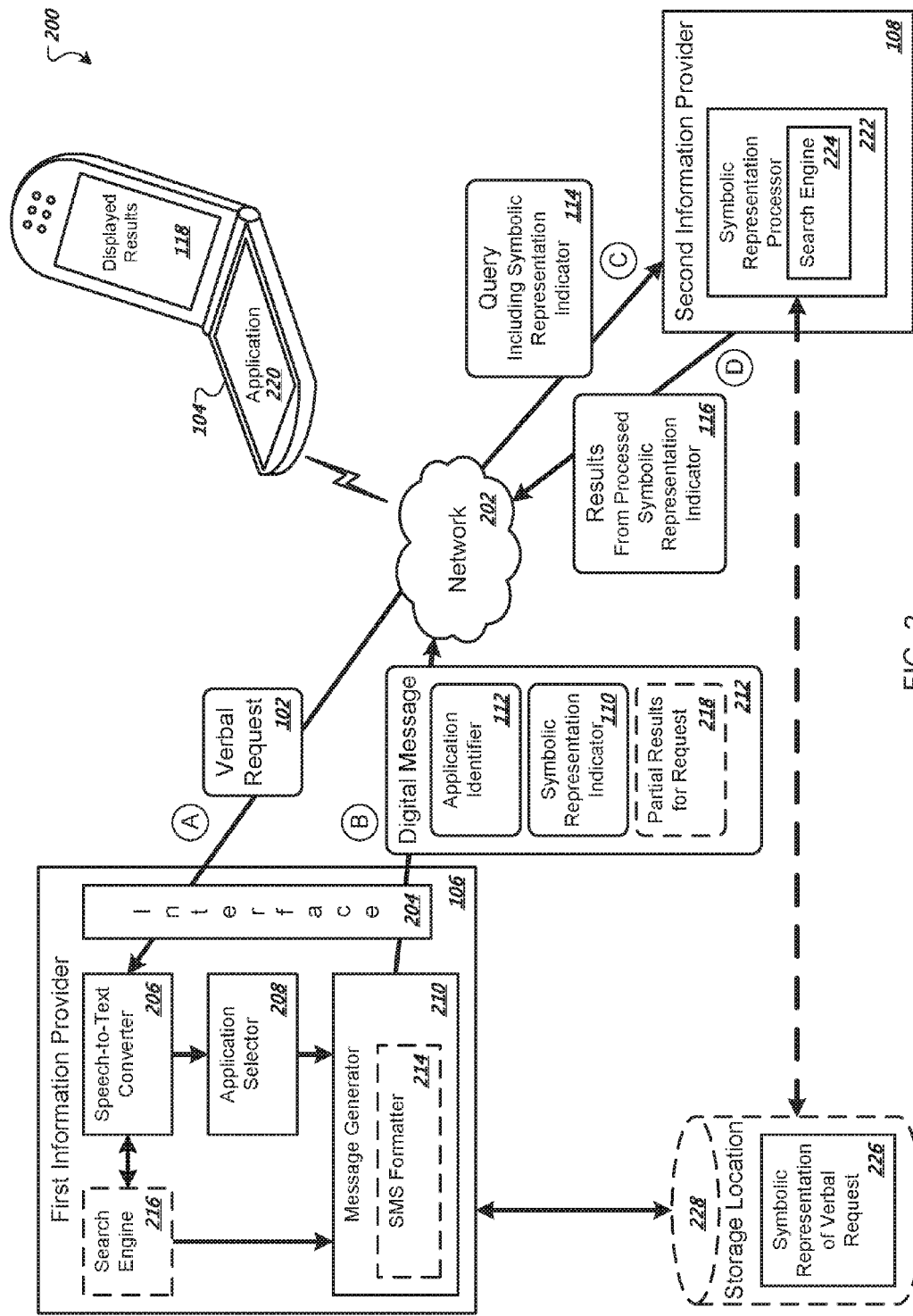
FIG. 2 is a schematic diagram of a system 200 depicting an automated implementation of the system 100 of FIG. 1.

FIG. 2 is a schematic diagram of a system 200 depicting an automated implementation of the system 100 of FIG. 1. The remote device 104, the first information provider 106, and the second information provider 108 are in communication via a network 202, such as a local area network, a wide area network, the Internet, a telephone network, or a combination of networks.

The first information provider 106 receives the verbal request 102 via an interface 204. In certain implementations, the remote device 104 transmits a recorded message as the verbal request 102. For example, a user may record the request before connection to the first information provider. In other implementations, the verbal request is made after an established connection with the first service provider 106.

The first information provider 106 includes a speech-to-text converter 206 that converts the verbal request 102 into text. An application selector 208 selects the application to be launched at the remote device 104 based on, for example, the content of the converted verbal request. For example, the application selector 208 may determine from the location name, "Palo Alto," that the user is requesting a map of locations within Palo Alto. The application selector 208 generates the application identifier 112 based on the selected application. The application identifier 112, when received at the remote device 104, instructs the remote device 104 to launch the selected application.

In other implementations, the application selector is optional because the application identifier 112 is predetermined so that every verbal request is related to a single application. For example, every request made to the first service provider may be for mapping locations, so the application identifier 112 may be binary code that always launches a mapping application.

A message generator 210 uses the converted verbal request to generate a digital message 212 for transmission to the remote device. In certain implementations, the digital message 212 includes the application identifier 112 and the symbolic representation indicator. The first information provider 106 transmits the digital message 212 to the remote device 104. In certain implementations, the message generator 210 uses a Short Message Service (SMS) formatter 214 to format the digital message 212 as an SMS message. The application identifier 112 and/or the symbolic representation indicator 110 may include binary values or American Standard Code for Information Interchange (ASCII) values.

In certain implementations, the first information provider 106 includes a search engine 216 capable of performing a search using the symbolic representation of the verbal request 102. The search engine 216 outputs the search results to the message generator 210. The message generator 210 includes partial results 218 for the verbal request 102 in the digital message 212. For example, the partial results 218 may include in the SMS message an address for a pizza parlor, which was returned as the top result for the verbal request "Pizza, Palo Alto." In another example, the partial results 281 include a list of the top 3, 5, or 10 results. A user may make a selection from the partial results 218 to be used in the query 114 to the second information provider 108, such as a particular pizza restaurant in Palo Alto to highlight on a map instead of all pizza restaurants in Palo Alto.

The remote device 104 uses the application identifier 112 to launch an application 220. In certain implementations, the application 220 is a calendar application and the verbal request 102 is a request to manage event information in a calendar. In other implementations, the application 220 is a mapping application and the verbal request 102 is a request to display one or more locations on a map. The locations may be identified, for example, by keywords (e.g., pizza) and/or addresses (e.g., Palo Alto). In still other implementations, the application 220 is a contact application and the verbal request 102 is a request to manage contact information. In other implementations, the application 220 is a search result user interface (e.g., web browser accessing an internet search page) and the verbal request 102 is a search query.

After launching, the application 220 formats the symbolic representation for inclusion in the query 114. The remote device 104 transmits the query 114, including the symbolic representation indicator 110, to the second information provider 108.

The second information provider 108 includes a symbolic representation processor 222 that processes the symbolic representation of the verbal request 102 received in the query 114. The symbolic representation processor 222 includes a search engine 224 that performs a search using the query 114, such as a search of pizza restaurants.

In certain implementations, the first information provider 106 places a symbolic representation 226 of the verbal request 102 in a storage location 228 and the symbolic representation indicator 110 indicates the location of the symbolic representation 226, such as with a Uniform Resource Locator (URI). For example, where the symbolic representation 226 of the verbal request is too large to be included in an SMS message, the symbolic representation 226 may be placed in the storage location 228. The second information provider 108 retrieves the symbolic representation 226 using the symbolic representation indicator 110 and processes the query 114 using the symbolic representation 226.

The remote device 104 receives the results 116 from the second information provider 108 and presents the displayed results 118 to a user. In certain implementations, results including map locations may also include directions to the locations. To calculate the directions, the starting location may be input by a user of the remote device 104, or the starting location may be provided by a global positioning component of the remote device 104. Additionally, a user may enter input which causes a displayed map to show more or less detail of the map, such as by zooming in or out on the map.

Figure 3:
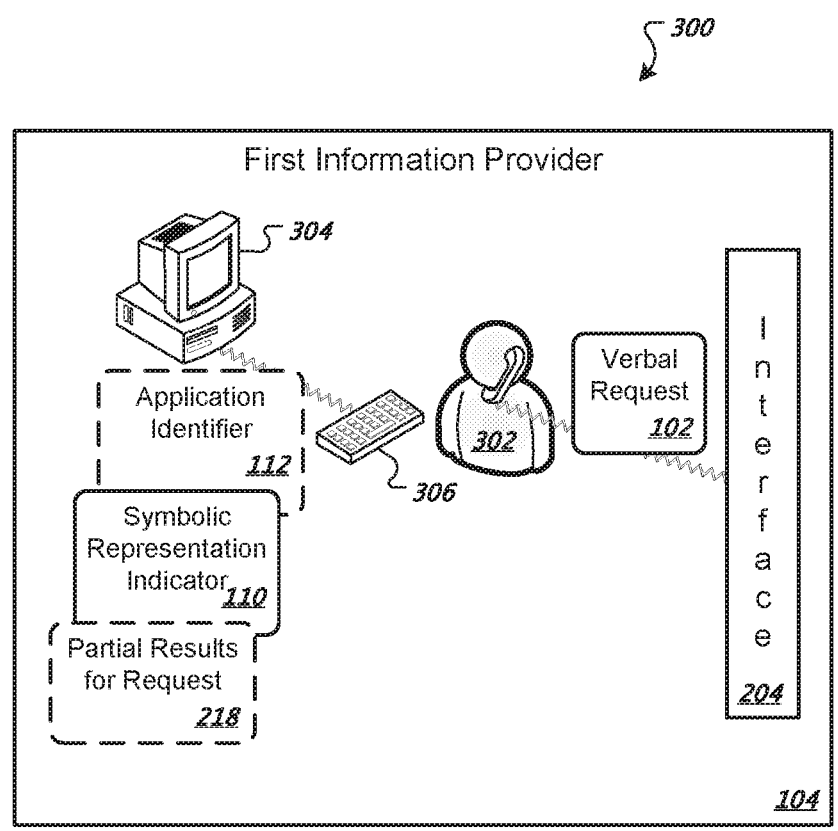
FIG. 3 is a schematic diagram of a system 300 depicting a partially manual implementation of the system of FIG. 1.

FIG. 3 is a schematic diagram of a system 300 depicting a partially manual implementation of the system of FIG. 1. In this example, a person 302 at the first information provider 104 receives the verbal request 102. Here, the interface 204 includes a telephone interface. The person 302 translates the verbal request 102 and inputs the symbolic representation indicator 110 into a computer device 304 using an input device 306, such as a keyboard, pointing device, or touch screen. In this example, the person 302 performs the operations of the speech-to-text converter 206. Additionally, the person 302 can input the application identifier 112 and/or the partial results 218 for the verbal request 102 performing the operations of the application selector 208 and the search engine 216, respectively.

Figure 4:
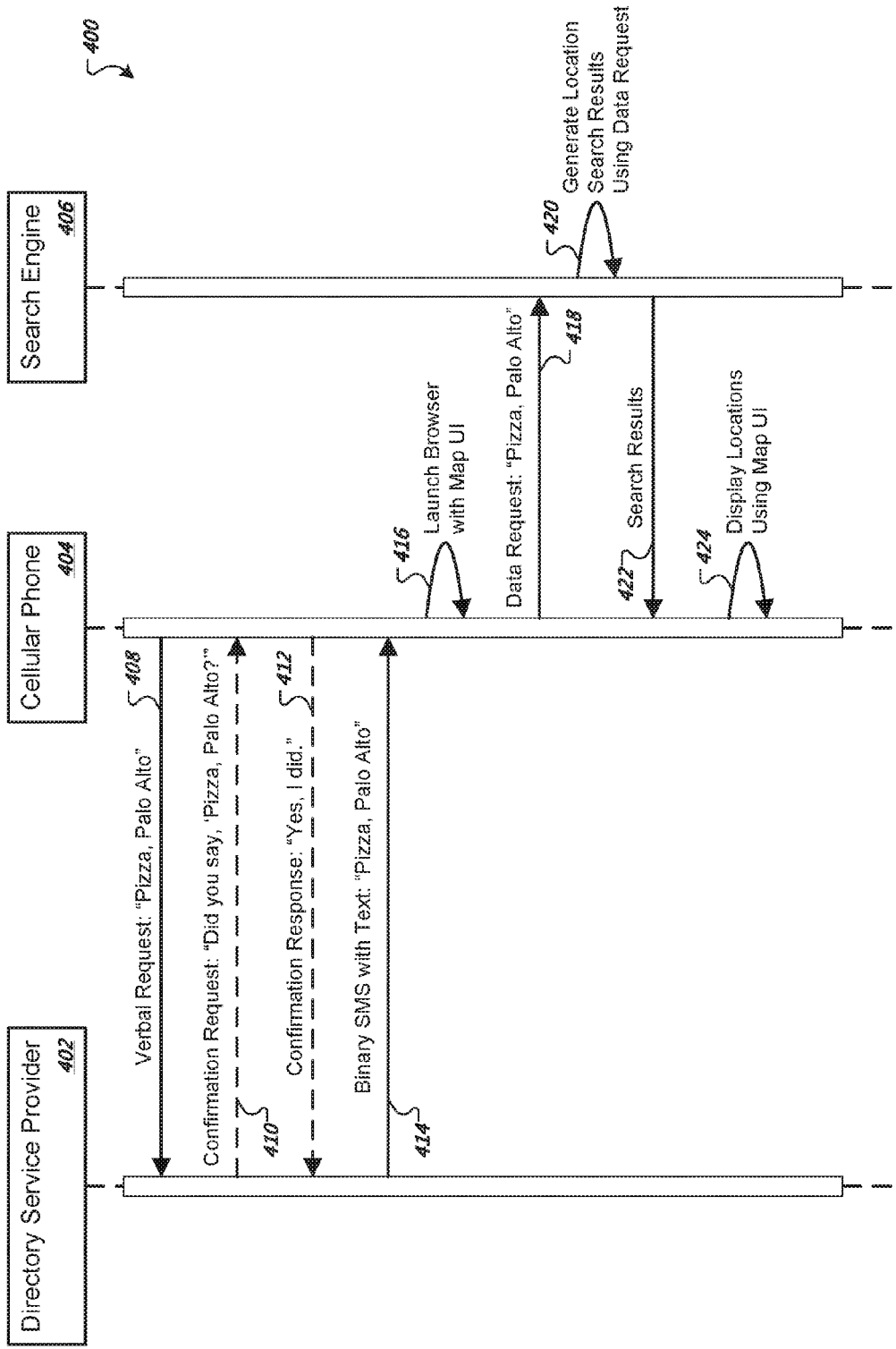
FIG. 4 is a sequence diagram depicting an example of interactions between a directory service provider, a cellular phone, and a search engine.

FIG. 4 is a sequence diagram depicting an example of interactions 400 between a directory service provider 402, a cellular phone 404, and a search engine 406. The cellular phone 404 transmits a verbal request 408 to the directory service provider, such as "Pizza, Palo Alto."

The directory service provider 402 receives the verbal request 408 and, using a speech-to-text conversion, converts the verbal request 408 into a symbolic representation. In certain implementations, the directory service provider 402 transmits a confirmation request 410 to the cellular phone 404. The confirmation request 410 can include computer-generated speech based on the symbolic representation, such as "Did you say, 'Pizza, Palo Alto?'" In other implementations, the directory service provider 402 may transmit a confirmation request 410 including a text query containing the symbolic representation. For example, the confirmation request 410 may be an SMS message with the text "Did you say, 'Pizza, Palo Alto?" The cellular phone 404 transmits a confirmation response 412 to the directory service provider 402 from the user, such as "Yes, I did." The confirmation response 412 may be verbal or symbolic, such pressing the key '1' on a keypad to indicate "Yes" and pressing the key '2' to indicate "No."

In other implementations, the user may correct the translation of the verbal request by verbally repeating the request, by typing the text using a keypad, or by selecting from a list of possible translations of the verbal request.

The directory service provider 402 generates a binary SMS message 414 and transmits the message 414 to the cellular phone 404. The message 414 includes text, such as "Pizza, Palo Alto," and an application identifier, such as binary code used to launch or execute a function of an internet browser or a custom application (e.g., Google Maps for Mobile developed by Google™ of Mountain View, Calif.) installed on the cellular phone 404.

The cellular phone 404 receives the message 414 and launches the browser 416 (or the custom application) with a map user interface (UI) based on the included application identifier. The browser 416 with map user interface transmits a data request 418 to the search engine 406 including the symbolic representation, such as "Pizza, Palo Alto."

The search engine 406 generates location search results 420 using the symbolic representation in the data request 418 (or from the storage location 228 as previously described). For example, the search engine 406 may determine that "Pizza" indicates a request for pizza restaurants and "Palo Alto" further indicates a request for pizza restaurant locations in the Palo Alto area. The search engine 406 transmits search results 422 to the cellular phone 404. The cellular phone 404 receives the results 422 and displays locations 424 using the map user interface.

Figure 5:
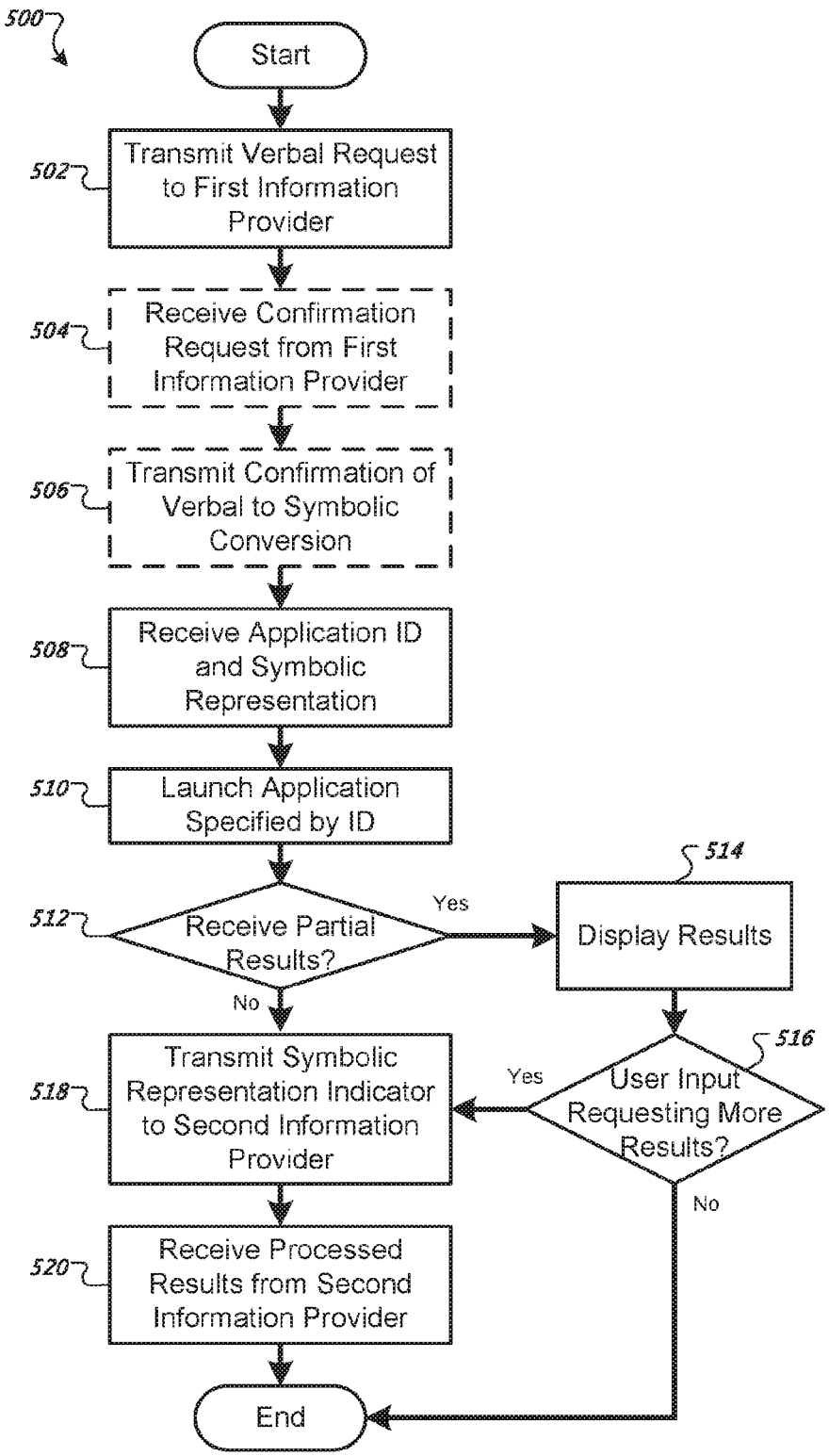
FIG. 5 is a flow chart depicting an example of a method for displaying on a remote device information derived from a verbal request.

FIG. 5 is a flow chart depicting an example of a method for displaying on a remote device information derived from a verbal request. The process 500 may be performed, for example, by a system such as the systems 100, 200, and 400. For clarity of presentation, the description that follows uses the systems 100, 200, and 400 as the basis of an example for describing the process 500. However, another system, or combination of systems, may be used to perform the process 500.

The process 500 begins with transmitting (502) a verbal request to a first information provider. For example, the remote device 104 transmits the verbal request 102, including "Pizza, Palo Alto," to the first information provider 106 via the network 202.

Optionally, a confirmation request is received (504) from the first information provider. The confirmation request seeks to confirm that a conversion of the verbal request to a symbolic representation, such as speech-to-text, is accurate. For example, the cellular phone 404 receives, from the directory service provider 402, the confirmation request 410 "Did you say, 'Pizza, Palo Alto?'"

Optionally, a confirmation of the verbal to symbolic conversion is transmitted (506). For example, a user replies "Yes, I did," which is transmitted by the cellular phone 404 to the directory service provider 402.

An application identifier and a symbolic representation indicator is received (508). For example, the remoter device 104 receives the digital message 212 including the application identifier 112 and the symbolic representation indicator 110.

An application specified by the application identifier is launched (510). For example, the remote device 104 launches the application 220 specified by the application identifier 112.

If partial results are received in response to the verbal request 512, then the results an be displayed (514). If a user requests more results or the partial results were not received (516), then the process 500 transmits (518) the symbolic representation indicator to a second information provider.

For example, the remote device 104 may present the partial results 218 including addresses for locations associated with the verbal request and receive a user input requesting more results. If a user requests more results or partial results were not transmitted, the remote device 104 transmits the symbolic representation indicator 110, including "Pizza, Palo Alto," to a search engine that returns mapped locations in response to location queries.

Processed results are received from the second information provider (520). For example, the remote device 104 receives the results 116 from the second information provider 108, including a map with locations of pizza restaurants in Palo Alto highlighted.

Figure 6:
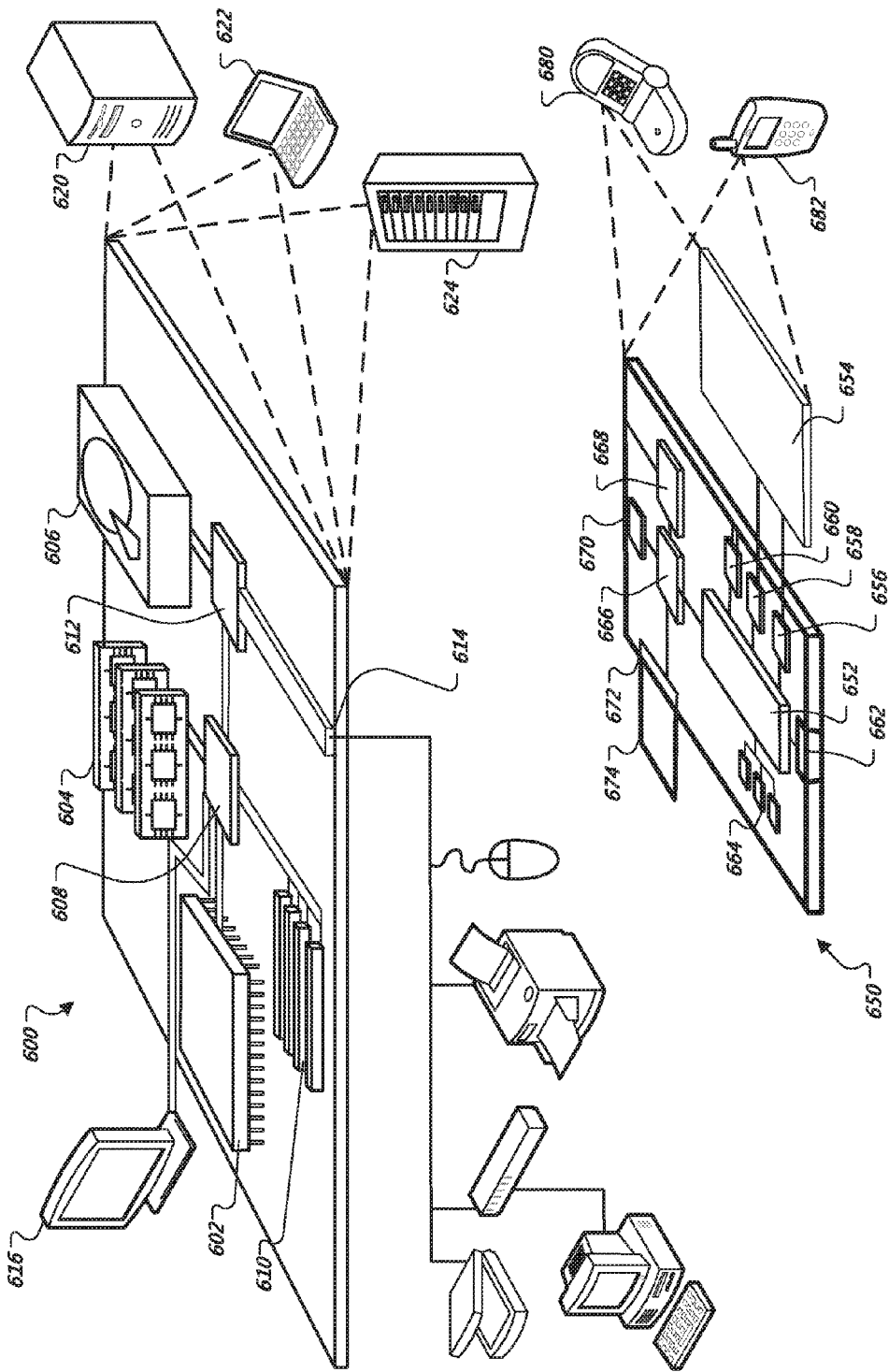
FIG. 6 is a schematic diagram depicting an example of a general computer system and a general mobile device that may be used in the systems and methods described in FIGS. 1-5.

FIG. 6 is a block diagram of computing devices 600, 650 that may be used to implement the systems and methods described in this document, either as a client, as a server, or as a plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, the first information provider 106 and the second information provider 108 may be the same system or may be included in a single system.

Additionally, the application identifier 112 does not have to launch the application. Instead, it can be used to initiate a function of an application that has been previously launched. For example, the application identifier can indicate that the a previously launched internet browser should navigate to a particular site identified by a URL included in the digital message 212.

In some implementations, the request 102 is a written request and the remote device 104 that transmits the request 102 is a personal computer, and the request 102 can be passed directly to the search engine 216 and the application selector without speech-to-text conversion.

Although SMS is used as an example in the above descriptions, in other implementations, the described systems and method may use a variety of mechanisms to transmit information to the remote device 104. For example, the first information provider 106 can use actual push mechanisms, such as session-initiated protocol (SIP) and SMS transmissions, or virtual push mechanisms, such as polling using hypertext transmission protocol (HTTP).

Additionally, in some implementations, the request 102 can split up into multiple requests. For example, the request 102 can be a two-phase interaction, where a user of the remote device requests a location first (e.g., Dallas, Tex.), which is confirmed by the first information provider. Next, the user transmits a second portion of the request, which specifies a particular category or item for which to search (e.g., barbeque).

In yet other implementations, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

What is claimed is:

1. A method comprising:
transmitting, by a computing device and to a remote server, a verbal input;
receiving, by the computing device and from the remote server, a digital message that comprises a symbolic representation of the verbal input;
determining, based on the symbolic representation of the verbal input, an application identifier for an application that is indicated by the symbolic representation of the verbal input;
launching, by the computing device and using the application identifier, the application that is indicated by the symbolic representation of the verbal input;
transmitting, using the application and to an information provider, a query that was generated based on the symbolic representation of the verbal input;
obtaining, by the computing device and from the information provider as a response to the query, an information result; and
presenting, through an application interface of the computing device, the information result.

2. The method of claim 1, further comprising:
formatting, using the application, the symbolic representation of the verbal input for inclusion in the query.

3. The method of claim 1, further comprising:
after presenting the information result, receiving further input from a user,
updating the information result to provide more detail; and
presenting the updated information result.

4. The method of claim 1, further comprising:
after presenting the information result, receiving further input from a user,
updating the information result to provide less detail; and
presenting the updated information result.

5. The method of claim 1, wherein presenting the information result comprises displaying a representation of the information result along with a map in a graphical interface displayed on a screen of the computing device.

6. The method of claim 1, wherein presenting the information result comprises audibly presenting the information result.

7. The method of claim 1, further comprising transmitting, from the computing device and to the remote server, in response to receiving the digital message, a confirmation message to acknowledge receipt of the digital message.

8. A system comprising:
one or more computer processors; and
one or more non-transitory computer readable devices that include instructions that, when executed by the one or more computer processors, causes the processors to perform operations, the operations comprising:
transmitting, to a remote server, a verbal input;

receiving, from the remote server, a digital message that comprises a symbolic representation of the verbal input;

determining, based on the symbolic representation of the verbal input, an application identifier for an application that is indicated by the symbolic representation of the verbal input;

launching, using the application identifier, the application that is indicated by the symbolic representation of the verbal input;

transmitting, using the application and to an information provider, a query that was generated based on the symbolic representation of the verbal input;

obtaining, from the information provider as a response to the query, an information result; and presenting, through an application interface, the information result.

9. The system of claim 8, the operations further comprising:

formatting, using the application, the symbolic representation of the verbal input for inclusion in the query.

10. The system of claim 8, the operations further comprising:

after presenting the information result, receiving further input from a user, updating the information result to provide more detail; and presenting the updated information result.

11. The system of claim 8, the operations further comprising:

after presenting the information result, receiving further input from a user, updating the information result to provide less detail; and presenting the updated information result.

12. The system of claim 8, wherein presenting the information result comprises audibly presenting the information result.

13. The system of claim 8, the operations further comprising:

receiving a confirmation request; and transmitting a confirmation response to the remote server.

14. One or more non-transitory computer-readable media storing instructions that, when executed by a processor, perform operations comprising:

transmitting, to a remote server, a verbal input;

receiving, from the remote server, a digital message that comprises a symbolic representation of the verbal input;

determining, based on the symbolic representation of the verbal input, an application identifier for an application that is indicated by the symbolic representation of the verbal input;

launching, using the application identifier, the application that is indicated by the symbolic representation of the verbal input;

transmitting, using the application and to an information provider, a query that was generated based on the symbolic representation of the verbal input;

obtaining, from the information provider as a response to the query, an information result; and presenting, through an application interface, the information result.

15. The tangible computer-readable media of claim 14, the operations further comprising:

after presenting the information result, receiving further input from a user, updating the information result to provide more detail; and presenting the updated information result.

16. The tangible computer-readable media of claim 14, the operations further comprising:

after presenting the information result, receiving further input from a user, updating the information result to provide less detail; and presenting the updated information result.

17. The tangible computer-readable media of claim 14, the operations further comprising:

receiving a confirmation request; and transmitting a confirmation response to the remote server.

18. The tangible computer-readable media of claim 14, wherein presenting the information result comprises audibly presenting the information result.

\* \* \* \* \*